June 2, 1925.                    1,540,508
C. W. WHITE
AXLE CAP
Filed Sept. 14, 1923
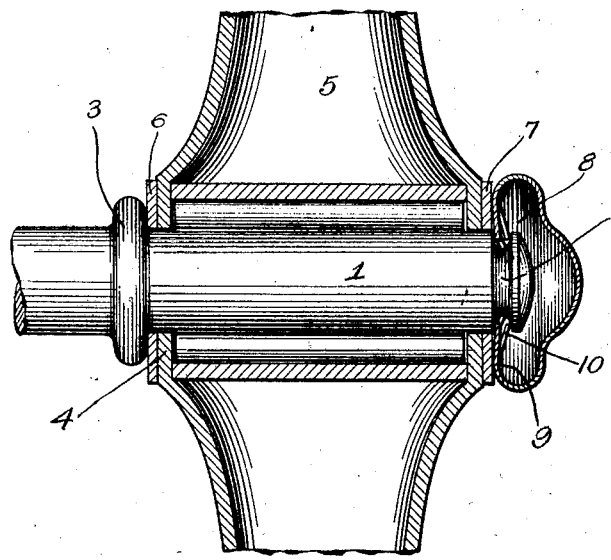
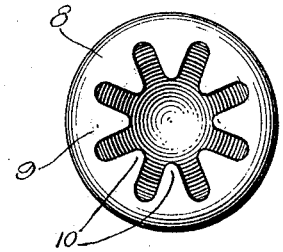
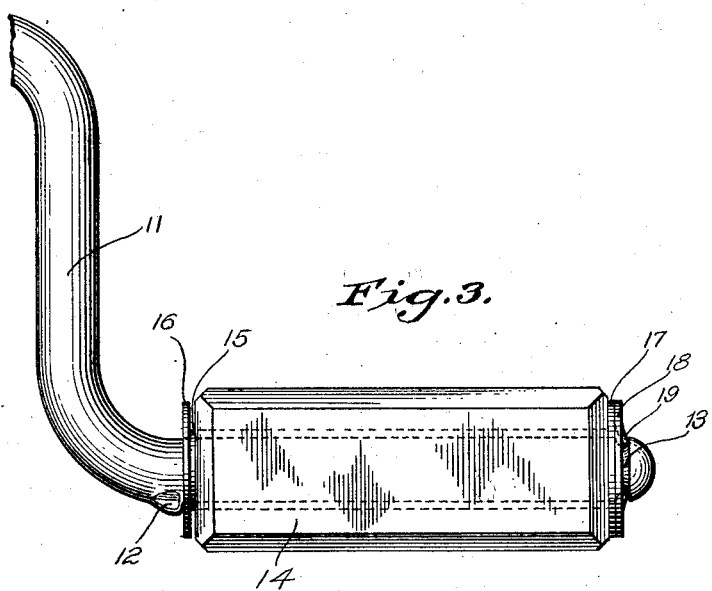
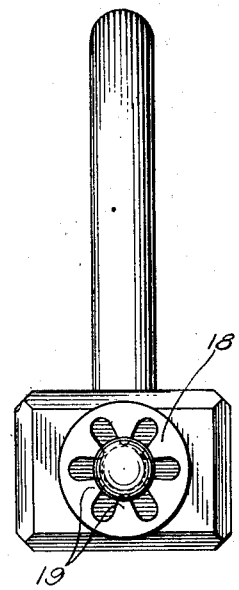
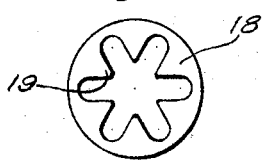
INVENTOR
CLARENCE WATSON WHITE
BY
HIS ATTORNEY Patented June 2, 1925.

1,540,508

UNITED STATES PATENT OFFICE.

CLARENCE WATSON WHITE, OF NORTH BENNINGTON, VERMONT.

AXLE CAP.

Application filed September 14, 1923. Serial No. 662,695.

*To all whom it may concern:*

Be it known that I, CLARENCE WATSON WHITE, a citizen of the United States, residing at North Bennington, in the county of Bennington and State of Vermont, have invented new and useful Improvements in Axle Caps, of which the following is a specification.

This invention relates to means for providing an abutment upon bearing rods and the like, and particularly to means for locking wheels, pedals and the like to bearing rods or axles. An object of the invention is to provide an improved construction of this type which is exceptionally simple, durable and inexpensive; which can be readily and easily assembled; and which can be produced entirely from sheet and stock material by stamping and die machinery. Further objects and advantages will be apparent from the following description of various embodiments of the invention and the novel features will be particularly pointed out hereinafter in claims.

In the accompanying drawing:

Fig. 1 is a sectional elevation of an axle, and a portion of a wheel which is confined thereon by means constructed according to the principle of the invention;

Fig. 2 is an end elevation of the improved hub cap thereof;

Fig. 3 is a side elevation of a pedal of a velocipede which utilizes a modification of the invention;

Fig. 4 is an end elevation of the same; and

Fig. 5 is an elevation of the locking washer of the same.

In the embodiment of Figs. 1 and 2, an axle 1 is provided with an annular groove 2 adjacent an end, and with an abutment 3 spaced further from the end. The hub 4 of a wheel 5 is placed upon the axle between the abutment and the groove, with a washer 6 preferably disposed between the hub and the abutment. A washer 7 may also be placed upon the axle between the hub and the groove. A hub cap 8 is provided with an inturned flange 9 which is adapted to fit over the end of the axle. The flange is slit radially from its inner periphery so as to provide a plurality of spring tongues 10. The inner diameter of the flange is less than the diameter of the axle and greater than the diameter of the bottom of the groove, so that when the flange is forced over the end of the axle the tongues of the flange will be sprung until they reach the groove, whereupon they will automatically snap into the groove and lock the cap to the axle, the walls of the groove thus serving as abutments for the flange. The cap effectively confines the wheel to the axle, and may be easily applied to or removed from the axle.

If desired, the alternate tongues of the flange may be deflected in opposite directions. Then when the cap is applied to the axle, one set of tongues will first enter the groove and be flexed by the walls thereof, while the cap is moved further upon the axle to allow the other tongues to snap into the groove. With such an arrangement, the tongues while in the groove will be compressed toward one another by the walls of the groove and the cap will be yieldingly held against vibration or rattling upon the axle.

In Figs. 3 to 5, another embodiment of the invention is illustrated. The pedal shaft 11 is pinched, as at 12, to form an abutment, and an annular groove 13 is provided adjacent the outer end. A pedal pad or bar 14 of suitable material, such as rubber, may be mounted upon a sleeve 15 which rotatably fits the shaft 11 between the abutment 12 and the groove 13. A washer 16 may be disposed between the abutment 12 and the sleeve 15, and another washer 17 between the sleeve 15 and the groove.

A locking member 18, which is shown in the form of a disc, is provided with tongues 19 extending inwardly and radially. The diameter between the inner ends of the tongues is greater than the diameter of the shaft at the bottom of the groove, and less than the diameter of the shaft. When forced upon the shaft, the tongues will snap into the groove and lock the disc thereon, which then serves as an abutment for confining the pedal pad or bar to the shaft. In this embodiment, the tongues may also be bent alternately in opposite directions slightly, as explained in connection with Figs. 1 and 2, so that when engaging with and compressed between the opposite walls of the groove, the disc will be yieldingly held against vibration or rattling upon the shaft.

It will be understood that the invention is also applicable to other constructions where similar problems are met, and that various changes in the details and arrangements of parts herein described and illustrated for the purpose of explaining the nature of the invention may be made by those skilled in the art, within the principle and scope of the invention, as expressed in the appended claims.

I claim:

1. In vehicles and the like, a bearing rod having an annular groove in its surface, and an abutment member on said rod, said member having a plurality of tongues extending radially and inwardly of the opening which fits over the rod, said tongues being adapted to snap into the groove and lock the member to the rod when the member is forced upon the rod and flexes the tongues, a number of said tongues having their free ends extending slightly out of the plane of the other tongues whereby after one set of tongues snap into the groove, further movement of the member to cause the other tongues to enter the groove will place both sets of tongues under compression between the walls of the groove.

2. In vehicles and the like, an axle rod having an annular groove adjacent an end and an abutment spaced further from the end, a member confined on the rod between the abutment and the groove, and a hub cap having an inturned flange fitting over the end of the rod, said flange being slit radially from its inner diameter so as to provide spring tongues, the diameter between the opposite tongues being less than the diameter of the rod whereby the tongues will be sprung when the cap is applied to the rod and then snap into the groove and lock the cap to the rod, a part of the tongues being formed with their free ends out of the plane of the other tongues, whereby after the tongues extending to one side snap into the groove, further movement of the member to cause the other tongues to enter the groove, will place both sets of tongues under compression between the walls of the groove.

In testimony whereof I have hereunto set my hand.

CLARENCE WATSON WHITE.